(12) United States Patent
Hu et al.

(10) Patent No.: US 10,774,266 B2
(45) Date of Patent: *Sep. 15, 2020

(54) FLAME RETARDANT COMPOUND, METHOD OF MAKING THE SAME, RESIN COMPOSITION AND ARTICLE MADE THEREFROM

(71) Applicant: Elite Electronic Material (Zhongshan) Co., Ltd., Zhongshan (CN)

(72) Inventors: Zhilong Hu, Zhongshan (CN); Teng Xu, Zhongshan (CN)

(73) Assignee: ELITE ELECTRONIC MATERIAL (ZHONGSHAN) CO., LTD., Zhongshan, Guang Dong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,962

(22) Filed: Nov. 19, 2018

(65) Prior Publication Data

US 2020/0095504 A1    Mar. 26, 2020

(30) Foreign Application Priority Data

Sep. 25, 2018    (CN) .......................... 2018 1 1115021

(51) Int. Cl.
*C09K 21/12*    (2006.01)
*C08K 5/5313*    (2006.01)
(Continued)

(52) U.S. Cl.
CPC .............. *C09K 21/12* (2013.01); *C07F 9/145* (2013.01); *C07F 9/28* (2013.01); *C07F 9/5013* (2013.01);
(Continued)

(58) Field of Classification Search
CPC .. C07F 9/091; C07F 9/12; C07F 9/145; C07F 9/5013; C07F 9/5316
See application file for complete search history.

(56) References Cited

U.S. PATENT DOCUMENTS 3,422,453 A * 1/1969 Arlen ........................ C07F 9/12
558/118
4,368,043 A * 1/1983 Yamauchi ............... A61L 27/16
523/118
(Continued)

FOREIGN PATENT DOCUMENTS

CN    101899310 A  * 12/2010
EP       1911434 A1  *  4/2008    .............. C07F 9/091
(Continued)

OTHER PUBLICATIONS

Google Patents Translation of WO-2019019465-A1 (2019, 25 pages).*
(Continued)

*Primary Examiner* — Brieann R Johnston
(74) *Attorney, Agent, or Firm* — Muncy, Geissler, Olds & Lowe, P.C.

(57) ABSTRACT

A compound having a structure represented by the following Formula (I), where $Q^1$ and $Q^2$ individually represent a functional group containing a C=C unsaturated bond and $J^1$ and $J^2$ individually represent a flame retardant group containing a phosphorus atom, useful in a resin composition for fabricating articles such as a prepreg, a resin film, a laminate or a printed circuit board, such that the articles have improved one or more properties including glass transition temperature, ratio of thermal expansion, peel strength, ther-
(Continued)

mal resistance, dielectric constant, dissipation factor and flame retardancy.

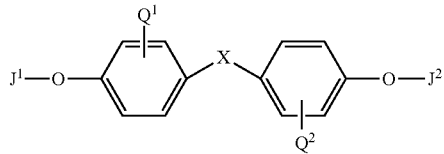

Formula (I)

17 Claims, 2 Drawing Sheets (51) Int. Cl.
*C08K 5/521* (2006.01)
*C08J 5/18* (2006.01)
*C08J 5/24* (2006.01)
*C07F 9/28* (2006.01)
*C07F 9/145* (2006.01)
*C08L 79/08* (2006.01)
*C07F 9/53* (2006.01)
*C07F 9/50* (2006.01)

(52) U.S. Cl.
CPC ............... *C07F 9/5316* (2013.01); *C08J 5/18* (2013.01); *C08J 5/24* (2013.01); *C08K 5/521* (2013.01); *C08K 5/5313* (2013.01); *C08L 79/08* (2013.01); *C08J 2379/08* (2013.01); *C08J 2425/10* (2013.01); *C08J 2447/00* (2013.01); *C08J 2471/12* (2013.01); *C08J 2475/06* (2013.01); *C08L 2201/02* (2013.01); *C08L 2203/16* (2013.01); *C08L 2203/20* (2013.01); *C08L 2205/025* (2013.01); *C08L 2205/035* (2013.01); *C08L 2312/02* (2013.01)

(56) References Cited

U.S. PATENT DOCUMENTS

| | | | |
|---|---|---|---|
| 7,557,152 B2* | 7/2009 | Kanno | C07F 9/242 |
| | | | 524/126 |
| 7,851,528 B2* | 12/2010 | Kanno | C08K 5/5313 |
| | | | 524/115 |
| 2018/0022898 A1* | 1/2018 | Pan | C08K 5/3725 |
| | | | 523/445 |
| 2020/0002365 A1* | 1/2020 | Zhang | C08K 5/5313 |

FOREIGN PATENT DOCUMENTS

| | | | | |
|---|---|---|---|---|
| JP | 08193090 A | * | 7/1996 | |
| WO | WO-2005012417 A1 | * | 2/2005 | ............ C08F 279/04 |
| WO | WO-2019019465 A1 | * | 1/2019 | ............ C08F 299/02 |

OTHER PUBLICATIONS

Google Patents Translation of CN-101899310-A (2010, 5 pages).*
STNext Abstract of SU 598909 (1978, 2 pages).*
STNext Abstract of JP 08193090 (1996, 2 pages).*

* cited by examiner

FLAME RETARDANT COMPOUND, METHOD OF MAKING THE SAME, RESIN COMPOSITION AND ARTICLE MADE THEREFROM

CROSS-REFERENCE TO RELATED APPLICATION

This application claims the priority benefits of China Patent Application No. 201811115021.2, filed on Sep. 25, 2018. The entirety the above-mentioned patent application is hereby incorporated by reference herein and made a part of this specification.

BACKGROUND

1. Field of the Disclosure

The present disclosure relates to a flame retardant compound, a method of making the same, a resin composition and an article made therefrom, more particularly to a compound, a method of making the same and a resin composition for the fabrication of a prepreg, a resin film, a laminate (e.g., a copper-clad laminate) and a printed circuit board.

2. Description of Related Art

Printed circuit boards are widely used in numerous applications, including for example industrial mainframe computers, communication apparatuses, electrical measurement devices, defense and aviation products and household electrical appliances, all of which need a printed circuit board to serve as the base for supporting various electronic components. With the advancement of technology, electronic products are developed rapidly toward the trend of miniaturization, multiple functions, high performance and high reliability. Therefore, the development of printed circuit boards is also directed to high precision, high density, high performance, fine hole formation, thin type and multiple layers.

During the fabrication of printed circuit boards and subsequent installation of other components, a reflow process is carried out to melt a solder and connect the surface components to the metal traces on the printed circuit boards. Deformation may occur due to the difference in ratio of thermal expansion after the resin material for making the insulation layers of the printed circuit boards has been subject to thermal shock in the reflow process; therefore, the board may be warped and deformed and have lowered flatness, causing subsequent poor soldering, such as non-wetting and other problems. High density interconnection in printed circuit boards causes the increase of heat generation, so there is need to provide a solution for improving the ratio of thermal expansion of insulation layers and other properties, particularly dielectric properties, thermal resistance, flame retardancy, etc.

SUMMARY

In view of the foregoing disadvantages, particularly the deterioration of some properties of insulation material, such as ratio of thermal expansion or dielectric properties, caused by using conventional flame retardants in the insulation material to provide flame retardancy, the present disclosure provides a compound useful in a resin composition to make articles such as a prepreg, a resin film, a laminate or a printed circuit board, thereby improving one or more properties of the articles such as flame retardancy, glass transition temperature, ratio of thermal expansion, peel strength, thermal resistance, dielectric constant, and dissipation factor.

The present disclosure provides a compound having a structure represented by the following Formula (I):

Formula (I)

wherein X represents a covalent bond, —C(CH$_3$)$_2$—, —CH(CH$_3$)—, —CH$_2$—, —SO$_2$—, —S—, or —O—;

Q$^1$ and Q$^2$ individually represent a functional group containing a C=C unsaturated bond; and J$^1$ and J$^2$ individually represent a flame retardant group containing a phosphorus atom.

For example, Q$^1$ and Q$^2$ may individually represent a C2 to C6 aliphatic hydrocarbyl group having a C=C unsaturated bond.

For example, J$^1$ and J$^2$ may individually contain a P=O double bond or a P—O single bond.

For example, J$^1$ and J$^2$ may individually have the following structure:

wherein A is oxygen or sulfur; n1 is 0 or 1; dotted line represents presence or absence of a bond; and R$_1$ and R$_2$ individually represent a halogen-containing group, an alkyl group with or without a double bond, an aryl group with or without a double bond, an alkoxy group, an aryloxy group, a sulfur-containing alkyl group, a sulfur-containing aryl group, a silyl group, or a siloxanyl group, and R$_1$ and R$_2$ are individually substituted or unsubstituted.

In one embodiment, J$^1$ and J$^2$ may individually represent a diphenyl phosphate group (DPP, the part not including the —OH group), a diphenylphosphine oxide group (DPPO, the part not including the P—H bond), or a 9,10-dihydro-9-oxa-10-phosphaphenanthrene-10-oxide group (DOPO, the part not including the P—H bond), wherein the diphenyl phosphate group, the diphenylphosphine oxide group or the 9,10-dihydro-9-oxa-10-phosphaphenanthrene-10-oxide group may be optionally substituted or unsubstituted.

For example, the compound of Formula (I) may have any one of the following structures:

Formula (II)

Formula (III)

Formula (IV)

In one embodiment, the compound of Formula (I) has a phosphorus content of between 6.0% and 9.0%.

In one embodiment, provided is a method of making the compound of Formula (I), comprising: reacting a compound with a flame retardant group containing a phosphorus atom with a bisphenol compound with a C=C unsaturated bond.

In one embodiment, the compound of Formula (I) may serve both as a crosslinking agent and as a flame retardant of a resin composition.

In one embodiment, further provided is a resin composition comprising the compound of Formula (I) and a resin.

For example, the resin may be an unsaturated bond-containing resin, such as containing one or more carbon-carbon double bonds, carbon-nitrogen double bonds or carbon-nitrogen triple bonds. Examples include but are not limited to polyolefin, cyanate ester resin, maleimide resin, vinyl-containing polyphenylene oxide resin, styrene, divinylbenzene, triallyl isocyanurate, triallyl cyanurate, a prepolymer thereof, or a combination thereof.

In one embodiment, the resin comprises a polar resin and a nonpolar resin, and the compound of Formula (I) may increase the compatibility of the polar resin and the nonpolar resin (i.e., solubilization). Preferably, no layer separation occurs between the polar resin and the nonpolar resin.

Unless otherwise specified, the amount or ratio of the compound of Formula (I) and the resin is not particularly limited; for example, the resin composition may comprise 1 to 100 parts by weight of the compound of Formula (I) relative to 100 parts by weight of the resin.

In one embodiment, the present disclosure also provides an article made from the resin composition described above, which comprises a prepreg, a resin film, a laminate or a printed circuit board. Preferably, the article has one or more of the following properties improved: glass transition temperature, ratio of thermal expansion, peel strength for copper foil, thermal resistance, dielectric constant, dissipation factor and flame retardancy.

DETAILED DESCRIPTION OF EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, "a," "an" or similar expression is employed to describe elements and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$," and Y is described as being "selected from a group consisting of $Y_1$, $Y_2$ and $Y_3$," the disclosure of any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

Compound

In one embodiment, the compound of the present disclosure has a structure represented by the following formula (I):

Formula (I)

wherein X represents a covalent bond, —C(CH$_3$)$_2$—, —CH(CH$_3$)—, —CH$_2$—, —SO$_2$—, —S—, or —O—;

$Q^1$ and $Q^2$ individually represent a functional group containing a C=C unsaturated bond; and $J^1$ and $J^2$ individually represent a flame retardant group containing a phosphorus atom.

In one embodiment, $Q^1$ and $Q^2$ may be individually at the ortho-position or meta-position relative to X and may be both at the ortho-position or both at the meta-position relative to X.

In one embodiment, $Q^1$ and $Q^2$ individually represent a C2 to C6 aliphatic hydrocarbyl group having a C=C unsaturated bond. For example, $Q^1$ and $Q^2$ may individually represent a C2, C3, C4, C5 or C6 alkenyl group, such as a vinyl group, a propenyl group or an allyl group, but not limited thereto.

In one embodiment, $J^1$ and $J^2$ may individually contain a P=O double bond or a P—O single bond. For example, $J^1$ and $J^2$ may individually have the following structure:

wherein A is oxygen or sulfur; n1 is 0 or 1; dotted line represents presence or absence of a bond; and $R_1$ and $R_2$ individually represent a halogen-containing group, an alkyl group with or without a double bond, an aryl group with or without a double bond, an alkoxy group, an aryloxy group, a sulfur-containing alkyl group, a sulfur-containing aryl group, a silyl group, or a siloxanyl group. Unless otherwise specified, $R_1$ and $R_2$ may be individually substituted or unsubstituted. For example, $R_1$ and $R_2$ may be individually substituted by a C1 to C6 alkyl group.

Unless otherwise specified, functional groups of various compounds disclosed herein are defined as below.

As used herein, "halogen" represents chlorine, bromine or iodine; "alkyl" represents a straight chain or branched chain saturated hydrocarbyl, such as a C1 to C6 saturated hydrocarbyl, such as methyl, ethyl, propyl, isopropyl, butyl, pentyl, hexyl and so on, but not limited thereto; "aryl" represents an aromatic ring system, such as a C6 to C18 aromatic substituent, such as phenyl, naphthyl, biphenyl, anthryl and so on, but not limited thereto; "alkoxy" represents an oxygen-containing alkyl, such as methoxy, ethoxy, propoxy, isopropoxy, butoxy, pentoxy, hexoxy and so on, but not limited thereto; "aryloxy" represents an oxygen-containing aryl group; "sulfur-containing alkyl" represents an alkyl with sulfur atom; "sulfur-containing aryl" represents an aryl with sulfur atom; "silyl" represents a substituent with Si—H or Si—Si bond; and "siloxanyl" represents a substituent with Si—O bond. If the "alkyl," "alkoxy" or "sulfur-containing alkyl" contains a branch chain, the longest carbon chain may have six carbons (e.g., C6).

In one embodiment, $J^1$ and $J^2$ may individually have the following structure:

wherein A, Y and T individually represent oxygen or sulfur; n1, m1 and c1 individually represent 0 or 1, and when m1 or c1 is 0, P is directly bonded to the benzene ring; the dotted line represents presence or absence of a bond; $R_3$ and $R_4$ individually represent hydrogen, an alkyl group, an alkenyl group, an aryl group with or without a double bond, an alkoxy group, an aryloxy group, a sulfur-containing alkyl group, a sulfur-containing aryl group, a silyl group, or a siloxanyl group, and $R_3$ and $R_4$ are individually substituted or unsubstituted; and a and b are individually an integer of 1 to 3, with the proviso that if the dotted line represents presence of a bond, then a+b≤4, and that if the dotted line represents absence of a bond, then a+b≤5.

In one embodiment, $J^1$ and $J^2$ may individually have the following structure:

wherein A, Y and T individually represent oxygen or sulfur; n1 is 0 or 1; m1 and c1 are both 0 or 1, and when m1 or c1 is 0, P is directly bonded to $R_6$ or $R_5$; and $R_5$ and $R_6$ individually represent a halogen-containing group, an alkyl group, an alkenyl group, an aryl group with or without a double bond, an alkoxy group, an aryloxy group, a sulfur-containing alkyl group, a sulfur-containing aryl group, a silyl group, or a siloxanyl group, and $R_5$ and $R_6$ are individually substituted or unsubstituted.

In one embodiment, $J^1$ and $J^2$ individually represent a diphenyl phosphate group (DPP), a diphenylphosphine oxide group (DPPO), or a 9,10-dihydro-9-oxa-10-phosphaphenanthrene-10-oxide group (DOPO). Unless otherwise specified, the diphenyl phosphate group, the diphenylphosphine oxide group or the 9,10-dihydro-9-oxa-10-phosphaphenanthrene-10-oxide group may be optionally substituted or unsubstituted, such as being substituted by a C1 to C6 alkyl group at the benzene ring.

For example, the compound of Formula (I) may have any one of the following structures:

(Formula (II), phosphorus content of 8.74%)

(Formula (III), phosphorus content of 8.02%)

(Formula (IV), phosphorus content of 7.0%)

In one embodiment, the compound of Formula (I) has a higher phosphorus content, such as greater than or equal to 6.0% or greater than or equal to 7.0%. For example, the compound of Formula (I) has a phosphorus content of between 6.0% and 9.0%.

The compound of Formula (I) provided herein has a high phosphorus content and includes two reactive functional groups, thereby increasing the crosslinking density and providing excellent flame retardancy of a system including a double bond-containing resin, as described below.

For example, the compound of Formula (I), in contrast with DABPA, divinylbenzene (DVB), TAIC or other conventional flame retardants, can provide excellent flame retardancy of a system including a double bond-containing resin such as BMI or polyphenylene oxide (PPO).

For example, the compound of Formula (I), in contrast with resorcinol bis(diphenyl phosphate) (RDP), bisphenol A bis(diphenyl phosphate) (BDP), resorcinol bis(2,6-dixylenyl phosphate) (RDX, commercially available under tradename PX-200) and other conventional phosphate flame retardants, not only provides comparable flame retardancy, but also contains reactive C═C unsaturated bond-containing functional groups (i.e., $Q^1$ and $Q^2$ groups) to be crosslinked with the resin system, which not only increases the glass transition temperature, but also solves the problems associated to stability, thermal resistance and conductive anodic filaments caused by decomposition and migration of conventional phosphate flame retardants after high temperature treatment to the surface of cured resin composition.

For example, the compound of Formula (I) has a structure with high symmetry and low polarity, and its does not contain high polarity, water-absorbing functional groups (e.g., hydroxyl group), thereby providing excellent dielectric properties. The present disclosure, when being applied to high speed and high frequency signal transmission, can provide flame retardancy and increase crosslinking density without affecting (deteriorating) the Dk/Df of the material.

For example, the compound of Formula (I) may increase the compatibility of the components (e.g., solubilization). For example, the compound of Formula (I) may increase the compatibility of the polar resin (e.g., BMI resin) and the nonpolar resin (e.g., polyolefin resin) to prevent precipitation of resin and difficult varnish application, film formation on prepreg surface, poor appearance and stickiness problems.

Method of Making the Compound

In one embodiment, provided herein is a method of making the compound of Formula (I), mainly comprising: reacting a compound with a flame retardant group containing a phosphorus atom with a bisphenol compound with a C═C unsaturated bond.

For example, the compound with a flame retardant group containing a phosphorus atom may be reacted with a bisphenol compound with a C═C unsaturated bond in the presence of solvent and heated to reflow, so as to obtain the compound of Formula (I).

In one embodiment, the reflow time may range from 1 hour to 10 hours, such as between 2 hours and 10 hours or between 4 hours and 8 hours. The reflow temperature may range from 50° C. to 200° C., such as between 50° C. and 180° C. or between 70° C. and 150° C.

In one embodiment, the suitable solvent may include, but not limited to, toluene (TL), dimethyl acetamide (DMAC), dimethyl formamide (DMF), propylene glycol methyl ether (PM), propylene glycol monomethyl ether acetate (PMA), cyclohexanone (CYC), acetone, methyl ethyl ketone (MEK) or a combination thereof.

The amount of the compound with a flame retardant group containing a phosphorus atom and the bisphenol compound with a C═C unsaturated bond is not particularly limited.

In one embodiment, the molar ratio of the compound with a flame retardant group containing a phosphorus atom to the bisphenol compound with a C═C unsaturated bond is 0.1:1 to excess. As used herein, "excess" represents the molar ratio of the flame retardant group containing a phosphorus atom to the phenolic hydroxyl group in the bisphenol compound with a C=C unsaturated bond is greater than 1:1, such as 2:1, 3:1, 4:1, 5:1 and so on (wherein the mole of functional group=(compound mass/compound molecular weight)*number of functional group in the compound). Preferably, the molar ratio of the flame retardant group containing a phosphorus atom to the phenolic hydroxyl group in the bisphenol compound with a C=C unsaturated bond is between 0.5:1 and 4:1, more preferably between 1:1 and 3:1.

In one embodiment, after the reaction is completed, toluene may optionally be used to wash the crude product to remove byproducts and impurities to improve the purity of the compound thus obtained.

As one of the reactants, the bisphenol compound with a C=C unsaturated bond may have a structure of Formula (V), wherein X, $Q^1$ and $Q^2$ are as defined above. For example, the bisphenol compound with a C=C unsaturated bond may be a bisphenol with a C=C unsaturated bond, such as 2,2'-diallyl-bisphenol A.

Formula (V)

As one of the reactants, the compound with a flame retardant group containing a phosphorus atom may be represented by $J^1$-$(R_7)n$ or $J^2$-$(R_7)n$, wherein n is an integer of 1 to 3, various structures and definitions of $J^1$ and $J^2$ are as described above, and $R_7$ represents a halogen, such as chlorine. For example, the compound with a flame retardant group containing a phosphorus atom may be a halide of a phosphate (e.g., diphenyl phosphate), a halide of a phosphine oxide (e.g., diphenylphosphine oxide or trichlorophosphine oxide) or a halide of 9,10-dihydro-9-oxa-10-phosphaphenanthrene-10-oxide. Unless otherwise specified, the halide described above may be substituted or unsubstituted, such as being substituted by a C1 to C6 alkyl group.

For example, the compound with a flame retardant group containing a phosphorus atom may be a compound of any one of Formula (VI) to Formula (IX), but not limited thereto:

Formula (VI)

Formula (VII)

Formula (VIII)

Formula (IX)

In one embodiment, the method of making the compound of Formula (I) comprises: reacting a compound with a flame retardant group containing a phosphorus atom with a bisphenol compound with a C=C unsaturated bond to provide a compound of Formula (I) wherein at least one of $J^1$ and/or $J^2$ comprises at least one halogen atom, which may be used as the reactant to react with a compound containing mono-functional active hydrogen, as described in Preparation Example 3.

In one embodiment, the compound containing mono-functional active hydrogen may be, but not limited to, alkanol, aryl phenol, double bond-containing alkanol, double bond-containing aryl phenol, alkoxy alcohol, aryloxy alcohol, alkylthio compound or arylthio compound, preferably aryl phenol, such as phenol or 2,6-dimethylphenol. In addition, the molar ratio of the active hydrogen and a functional group reacting with the active hydrogen (e.g., halogen atom on the compound with a flame retardant group containing a phosphorus atom) may be 0.1:1 to excess, such as but not limited to 1:1 to 4:1. The reaction of the mono-functional active hydrogen may be carried out at the same conditions as the reaction of the compound with a flame retardant group containing a phosphorus atom and the bisphenol compound with a C=C unsaturated bond or at the conditions with lowered temperature and/or shortened reaction time.

Specifically, in one embodiment, the compound of Formula (I) disclosed herein may be prepared according to any one of the following schemes, but not limited thereto:

(1) Reacting the bisphenol compound with a C=C unsaturated bond in the presence of a catalyst (e.g., Lewis acid catalyst, such as $AlCl_3$) with the compound with a flame retardant group containing a phosphorus atom (e.g., a halide of diphenyl phosphate, a halide of diphenylphosphine oxide or a halide of DOPO), so as to obtain the compound of Formula (I) in one step.

(2) Reacting the bisphenol compound with a C=C unsaturated bond in the presence of a catalyst (e.g., Lewis acid catalyst, such as $AlCl_3$) with the compound with a flame retardant group containing a phosphorus atom (e.g., trichlorophosphine oxide, $POCl_3$), so as to obtain the compound of Formula (I) wherein at least one of $J^1$ and/or $J^2$ comprises at least one halogen atom, which is used as the reactant to react with the compound containing mono-functional active hydrogen (e.g., active hydrogen of the hydroxyl group in 2,6-dimethylphenol), so as to obtain the compound of Formula (I) in two steps.

SYNTHESIS AND CHARACTERIZATION OF COMPOUND

Preparation Example 1

In a 1-liter three-necked bottle inserted with a thermometer and a condensation tube, add 100 mL of toluene, 0.6 mole (about 185 g) of diallyl bisphenol A (DABPA), 1.3 mole (about 308 g) of chlorodiphenylphosphine oxide (DPP-C1) and 3.0 g of anhydrous aluminum trichloride. Stir to completely dissolve the mixture and heat to a temperature of 140° C. to react for 6 to 8 hours. Cool the reaction to room temperature after completion, filter and extract the solution with a base, and finally reduce the pressure to remove the solvent to obtain the product which is the compound of Formula (II) (i.e., DABPA-bisDPP) with a yield of 95.5%.

Figure 1:
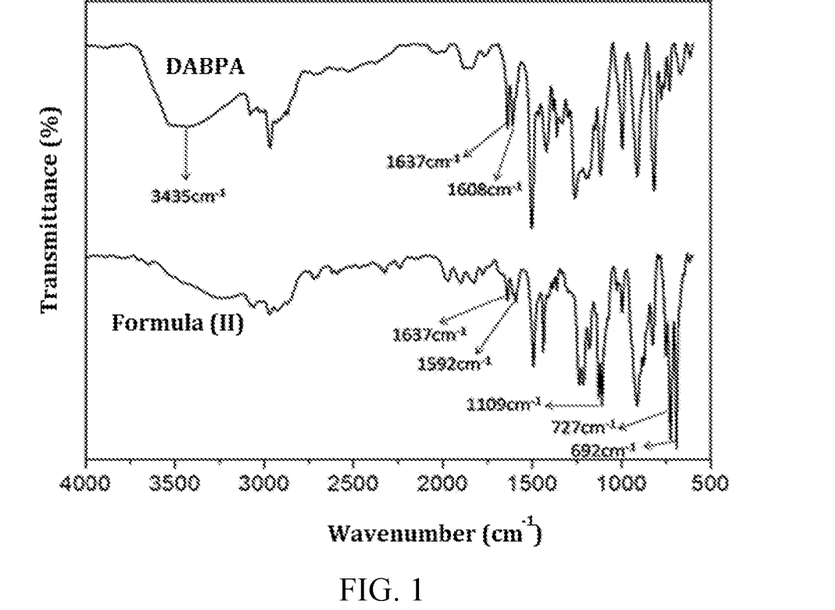
FIG. 1 illustrates the FTIR spectrum of the compound of Formula (II) and DABPA.

FIG. 1 illustrates the FTIR spectrum of the compound of Formula (II) and DABPA. The upper curve represents the raw material (DABPA) and the lower curve represents the product (compound of Formula (II)). It can be observed from the comparison that in the FTIR curve of the product, the absorption peak of the hydroxyl group at 3435 cm$^{-1}$ has disappeared, indicating complete reaction of the hydroxyl group. The characteristic peaks appear at 1592 cm$^{-1}$ (P=O), 692-727 cm$^{-1}$ (P-Ph), 1109 cm$^{-1}$ (P—O), and 1637 cm$^{-1}$ (C=C). The absorption peaks at 727 cm$^{-1}$ and 692 cm$^{-1}$ represent the bending vibration of the diphenylphosphine oxide group, indicating that the hydroxyl group on DABPA has been substituted with the diphenylphosphine oxide group.

Figure 2:
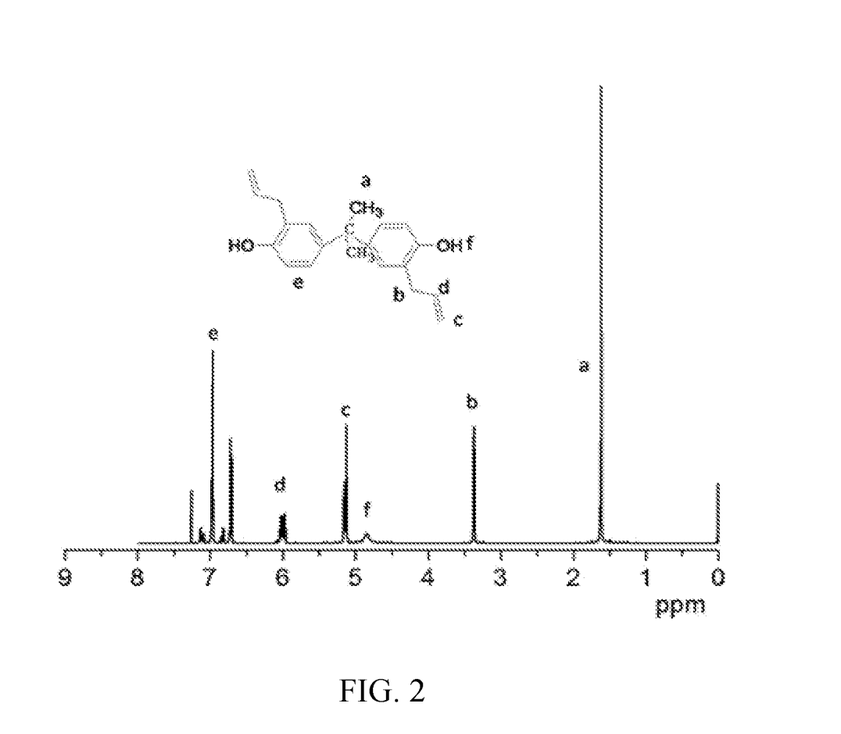
FIG. 2 illustrates the $^1$H NMR spectrum of DABPA.

FIG. 2 illustrates the $^1$H NMR spectrum of DABPA. Chemical shift δ=1.54 ppm represents the —CH$_3$ proton peak (position "a" in FIG. 2); δ=3.30 ppm represents the —CH$_2$— proton peak of allyl (position "b" in FIG. 2); δ=4.85 ppm represents the hydroxyl peak (position "f" in FIG. 2); δ=5.14 ppm represents the double bond CH$_2$ proton peak of allyl (position "c" in FIG. 2); δ=6.0 ppm represents the —CH= proton peak of allyl (position "d" in FIG. 2); and δ=6.7-7.2 ppm represents the benzene ring proton peak (position "e" in FIG. 2).

Figure 3:
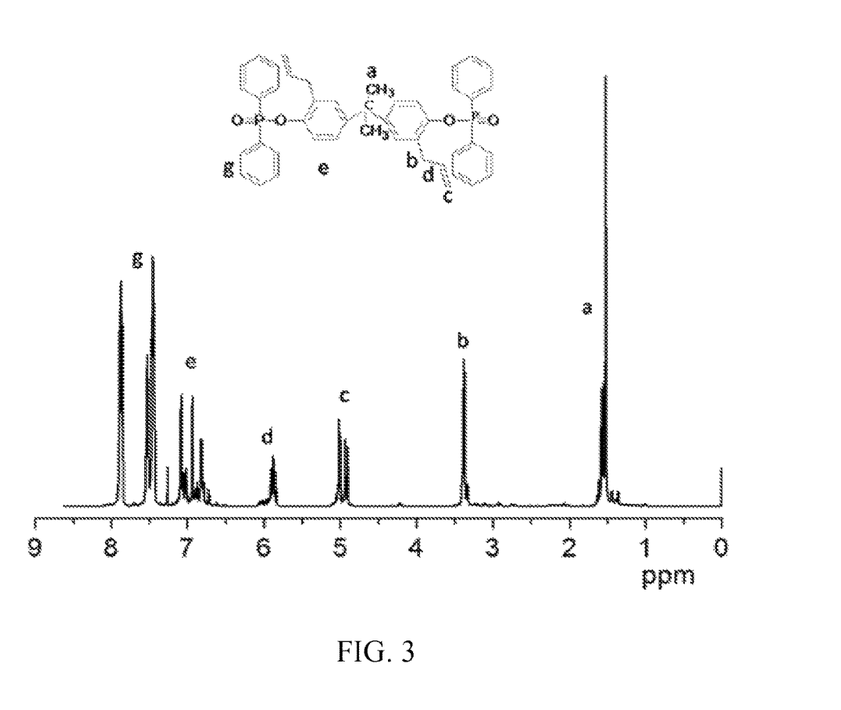
FIG. 3 illustrates the $^1$H NMR spectrum of the compound of Formula (II).

FIG. 3 illustrates the $^1$H NMR spectrum of the compound of Formula (II). It can be observed that the hydroxyl peak at δ=4.85 ppm has disappeared, at δ=7.4-8.0 ppm there is a strong signal representing the benzene ring proton peak of the diphenylphosphine oxide group (position "g" in FIG. 3), and the chemical shifts of other proton peaks are generally the same, indicating that the hydroxyl group on DABPA has been substituted with the diphenylphosphine oxide group.

Figure 4:
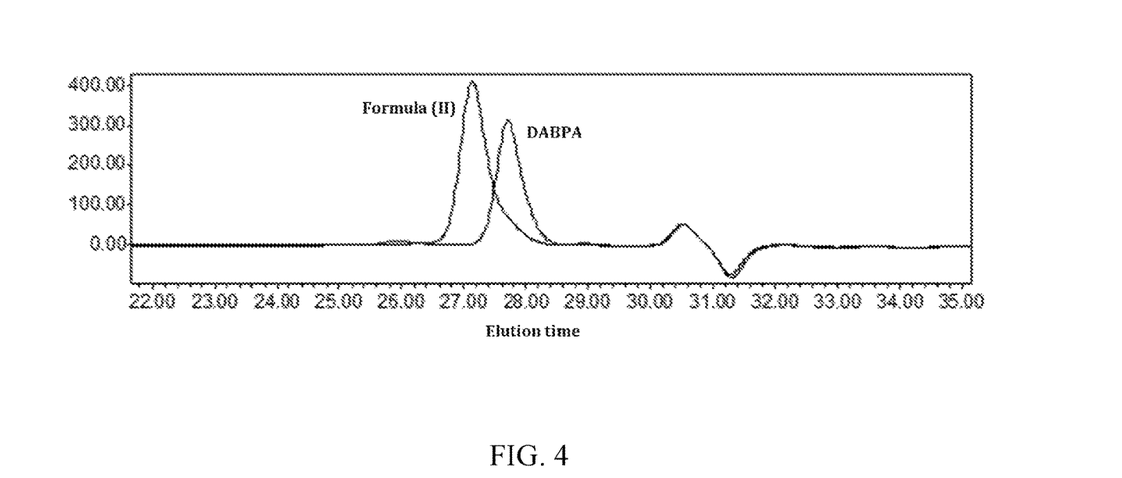
FIG. 4 illustrates the GPC spectrum of the compound of Formula (II) and DABPA.

FIG. 4 illustrates the GPC spectrum of the compound of Formula (II) and DABPA. The right curve represents the raw material (DABPA) and the left curve represents the product (compound of Formula (II)). Compared with DABPA, the compound of Formula (II) has an earlier elution time and a greater molecular weight, indicating that the diphenylphosphine oxide group has been bonded to DABPA to increase the molecular weight. The GPC curve has only one single peak with a symmetric shape, indicating the high purity of the product and that hydroxyl groups at two ends of DABPA have been completely substituted by diphenylphosphine oxide groups.

Preparation Example 2

In a 1-liter three-necked bottle inserted with a thermometer and a condensation tube, add 100 mL of toluene, 0.2 mole (about 61.7 g) of diallyl bisphenol A (DABPA), 1.0 mole (about 153 g) of trichlorophosphine oxide (POCl$_3$) and 1.0 g of anhydrous aluminum trichloride. Stir to completely dissolve the mixture and heat to a temperature of 120° C. to react for 4 hours. Reduce the pressure and distill to remove excessive trichlorophosphine oxide, add to the bottle with 1.5 mole (about 141 g) of phenol and 0.5 g of aluminum trichloride, and then heat to a temperature of 150° C. to react for 6 hours. Cool the reaction to room temperature after completion, filter and extract the solution with a base, and finally reduce the pressure to remove the solvent to obtain the product which is the compound of Formula (III) with a yield of 92.5%.

Preparation Example 3

In a 1-liter three-necked bottle inserted with a thermometer and a condensation tube, add 100 mL of toluene, 0.2 mole (about 61.7 g) of diallyl bisphenol A (DABPA), 1.0 mole (about 153 g) of trichlorophosphine oxide (POCl$_3$) and 1.0 g of anhydrous aluminum trichloride. Stir to completely dissolve the mixture and heat to a temperature of 120° C. to react for 4 hours. Reduce the pressure and distill to remove excessive trichlorophosphine oxide, add to the bottle with 1.5 mole (about 183 g) of 2,6-dimethylphenol and 0.5 g of aluminum trichloride, and then heat to a temperature of 150° C. to react for 6 hours. Cool the reaction to room temperature after completion, filter and extract the solution with a base, and finally reduce the pressure to remove the solvent to obtain the product which is the compound of Formula (IV) with a yield of 90.5%.

Resin Composition

Various examples of the compound of Formula (I) disclosed herein may be used in a resin composition as a crosslinking agent and/or a flame retardant.

Specifically, according to the present disclosure, the resin composition may comprise the compound of Formula (I) and a resin. For example, the resin composition may comprise, relative to 100 parts by weight of the resin, 1 to 100 parts by weight of the compound of Formula (I). For example, relative to 100 parts by weight of the resin, the amount of the compound of Formula (I) may be but not limited to 1 to 100 parts by weight, such as 5, 10, 15, 20, 25, 30, 35, 40, 45, 50, 55, 60, 65, 70, 75, 80, 85, 90 or 95 parts by weight.

The resin used in the resin composition of the present disclosure is not particularly limited and may include any resin useful for preparing a prepreg, a resin film, a laminate or a printed circuit board.

In one embodiment, the resin comprises a polar resin and a nonpolar resin, and the compound of Formula (I) may increase the compatibility of the polar resin and the nonpolar resin. The polar resin may be, but not limited to, epoxy resin, polyphenylene oxide resin, benzoxazine resin, maleimide resin, cyanate ester resin or maleic anhydride-modified styrene-butadiene copolymer. The nonpolar resin may be, but not limited to, polybutadiene homopolymer, styrene-butadiene copolymer, hydrogenated styrene-butadiene copolymer, styrene-butadiene-divinylbenzene terpolymer, styrene-isoprene copolymer or other hydrocarbon resins. Generally, the mixture of a polar resin solution and a nonpolar resin solution tends to occur layer separation problem due to the poor compatibility caused by the difference in polarity. When a mixture resin system containing both a polar resin and a nonpolar resin is added with a proper amount of the compound of Formula (I) as disclosed herein, such as in an amount of achieving a flame retardancy of V1 or V0 rating, the compatibility and stability of the mixture resin system is surprisingly increased due to the solubilization effect.

On the other hand, in one embodiment, the resin is an unsaturated bond-containing resin. Examples of the unsaturated bond-containing resin include but are not limited to a resin containing one or more carbon-carbon double bonds, a resin containing one or more carbon-nitrogen double bonds or a resin containing one or more carbon-nitrogen triple bonds. For example, in one embodiment, the unsaturated bond-containing resin is a vinyl-containing resin.

For example, the unsaturated bond-containing resin may comprise polyolefin, cyanate ester resin, maleimide resin, vinyl-containing polyphenylene oxide resin, styrene, divinylbenzene, triallyl isocyanurate, triallyl cyanurate, a prepolymer thereof, or a combination thereof.

In one embodiment, the resin composition disclosed herein comprises the compound of Formula (I) and a polyolefin, wherein the polyolefin includes but is not limited to styrene-butadiene-divinylbenzene terpolymer, styrene-butadiene-maleic anhydride terpolymer (a.k.a., maleic anhydride-modified styrene-butadiene), vinyl-polybutadiene-urethane oligomer, styrene-butadiene copolymer, styrene-isoprene copolymer, polybutadiene homopolymer, maleic anhydride-modified butadiene copolymer or a combination thereof.

In one embodiment, the resin composition of the present disclosure comprises the compound of Formula (I) and a cyanate ester resin, wherein the cyanate ester resin comprises, but not limited to, a cyanate ester resin with an Ar—O—C=N structure (wherein Ar represents an aromatic group), a novolac cyanate ester resin, a bisphenol A cyanate ester resin, a bisphenol A novolac cyanate ester resin, a bisphenol F cyanate ester resin, a bisphenol F novolac cyanate ester resin, a dicyclopentadiene-containing cyanate ester resin, a naphthalene-containing cyanate ester resin, or a phenolphthalein cyanate ester resin. Examples of the cyanate ester resin comprise those available under the tradename Primaset PT-15, PT-30S, PT-60S, BA-200, BA-230S, BA-3000S, BTP-2500, BTP-6020S, DT-4000, DT-7000, ULL950S, HTL-300, CE-320, LVT-50, and LeCy available from Lonza.

In one embodiment, the resin composition of the present disclosure comprises the compound of Formula (I) and a maleimide resin, wherein the examples of maleimide resin include but are not limited to 4,4'-diphenylmethane bismaleimide, oligomer of phenylmethane maleimide (a.k.a., polyphenylmethane maleimide), m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl hexane), N-2,3-xylylmaleimide, N-2,6-xylenemaleimide, N-phenylmaleimide, a prepolymer thereof (e.g., a prepolymer of a diallyl compound and a maleimide compound) and a combination thereof.

In one embodiment, the resin composition of the present disclosure comprises the compound of Formula (I) and a vinyl-containing polyphenylene oxide resin, wherein the vinyl-containing polyphenylene oxide resin refers to an unsaturated double bond-terminated polyphenylene oxide resin, including but not limited to a methacrylate-terminated polyphenylene oxide resin, a vinylbenzyl-terminated polyphenylene oxide resin, a vinylbenzyl-modified bisphenol A polyphenylene oxide resin, a chain-extended vinyl-containing polyphenylene oxide resin or a combination thereof. Examples include SA-9000 sold by SABIC or OPE-2st sold by Mitsubishi Gas Chemical Co., Inc. The chain-extended vinyl-containing polyphenylene oxide resin may include various polyphenylene oxide resins disclosed in the US Patent Application Publication No. 2016/0185904 A1, all of which are incorporated herein by reference in their entirety.

In addition to the aforesaid compound of Formula (I) and resin, the resin composition disclosed herein may optionally further comprise inorganic filler, curing accelerator, solvent, silane coupling agent, surfactant, coloring agent, toughening agent or a combination thereof. Unless otherwise specified, the amount of the aforesaid components is not particularly limited as long as the purpose of the present disclosure may be achieved. For example, relative to 1 to 100 parts by weight of the aforesaid resin, including the unsaturated bond-containing resin or a polar resin and a nonpolar resin, any additional components described above may be used at an amount of 0.01 to 100 parts by weight. For example, relative to 100 parts by weight of the aforesaid resin, any additional components described above may be used at an amount of 0.01 to 100 parts by weight, 0.01 to 200 parts by weight or 0.01 to 300 parts by weight.

In one embodiment, relative to 100 parts by weight of the resin, the resin composition of the present disclosure may further comprise 10 to 200 parts by weight of the inorganic filler, such as 10 to 100 parts by weight, so as to promote the thermal conductivity of the resin composition or improve its thermal expansion and mechanical strength, wherein the inorganic filler added thereto can be uniformly distributed in the resin composition.

For example, a suitable inorganic filler is not particularly limited and may comprise silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, sodium carbonate, titanium dioxide, zinc oxide, zirconium oxide, quartz, diamond powder, diamond-like carbon powder, graphite, magnesium carbonate, potassium titanate, ceramic fiber, mica, boehmite (AlOOH), zinc molybdate, ammonium molybdate, zinc borate, calcium phosphate, calcinated talc, talc, silicon nitride, mullite, calcinated kaolin, clay, glass bead, hollow glass bead, basic magnesium sulfate whisker, mullite whisker, barium sulfate, magnesium hydroxide whisker, magnesium oxide whisker, calcium oxide whisker, carbon nanotube, nano-scale silica and associated inorganic powder, and powder particles having an organic core and a shell modified by an insulator. In addition, the inorganic filler may be spherical, fibrous, plate-like, particulate, sheet-like or whisker-like and can be optionally subject to surface treatment, such as by a silane modifier (including but not limited to siloxane modifier), a fluorosilane modifier, or a titanate coupling agent.

In the present disclosure, any curing accelerator capable of increasing the curing rate of the resin composition of this disclosure is useful. Relative to 100 parts by weight of the resin, the curing accelerator may be present in an amount of between 0.01 part by weight and 10 parts by weight. The resin composition disclosed herein can be optionally added with one or more curing accelerators to increase the curing rate. The curing accelerator may comprise a catalyst, such as a Lewis base or a Lewis acid. The Lewis base includes any one or more of imidazole, boron trifluoride amine complex, ethyltriphenyl phosphonium chloride, 2-methylimidazole, 2-phenylimidazole, 2-ethyl-4-methylimidazole, triphenylphosphine, and 4-dimethylaminopyridine. The Lewis acid may comprise metal salt compounds, such as any one of those of manganese, iron, cobalt, nickel, copper and zinc, preferably zinc octanoate, cobalt octanoate, cobalt acetylacetonate, and zinc acetylacetonate as a metal catalyst. Alternatively, the curing accelerator may comprise a peroxide capable of producing free radicals, including but not limited to dicumyl peroxide, tert-butyl peroxybenzoate, 2,5-dimethyl-2,5-di(tert-butylperoxy)-3-hexyne, di(tert-butylperoxyisopropyl)benzene or any combination thereof.

In the present disclosure, the purpose of adding solvent is to change the solid content of the resin composition and to adjust the viscosity of the resin composition; relative to 100 parts by weight of the reactive components, the solvent may be used at an amount of 30 to 300 parts by weight. Unless otherwise specified, the solvent used in the present disclosure is not particularly limited as long as it is suitable for dissolving or diluting the resin composition, examples including but not limited to methanol, ethanol, ethylene glycol monomethyl ether, acetone, butanone (methyl ethyl ketone), methyl isobutyl ketone, cyclohexanone, toluene, y-butyrolactone, xylene, methoxyethyl acetate, ethoxyethyl acetate, propoxyethyl acetate, N-methyl-pyrrolidone (NMP), ethyl acetate, dimethyl formamide, dimethyl acetamide, propylene glycol methyl ether, or a mixture thereof.

Unless otherwise specified, the silane coupling agent used in the present disclosure is not particularly limited and may include any one or more silane coupling agents useful for making a prepreg, a resin film, a laminate, or a printed circuit board. Silane coupling agent may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane.

The purpose of adding surfactant is to provide wetting, viscosity reduction, solubilization or dispersion, so as to ensure uniform distribution of the inorganic filler in the resin composition. The coloring agent (i.e., staining agent) may comprise, but not limited to, dye or pigment. The purpose of adding toughening agent is to improve the toughness of the resin composition. The toughening agent may comprise, but not limited to, rubber resin, carboxyl-terminated butadiene acrylonitrile rubber (CTBN rubber), core-shell rubber, or a combination thereof.

Articles Made from Resin Compositions

The resin composition may be processed by various methods into different articles, such as those suitable for use as components in electronic products, including but not limited to a prepreg, a resin film, a laminate or a printed circuit board.

Specifically, the present disclosure provides a prepreg, which has an reinforcement material and an insulation layer formed thereon, wherein the insulation layer is made by heating the resin composition to a semi-cured state (B-stage) at a high temperature for example between 100° C. and 190° C. The reinforcement material may be woven fabric or non-woven fabric, and woven fabric may be such as fibrous material, including fiberglass fabrics, natural fiber fabrics or organic fiber fabrics, which can increase the mechanical strength of the prepreg. Organic fiber fabrics may comprise liquid crystal polymer woven fabric, such as polyester woven fabric, polyurethane woven fabric and so on, but not limited thereto. Types of fiberglass fabrics are not particularly limited and may be any commercial fiberglass fabric useful for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric comprises liquid crystal polymer non-woven fabric, such as polyester non-woven fabric, polyurethane non-woven fabric and so on, but not limited thereto. Preferably, the reinforcement material may optionally be subject to pretreatment, such as by a silane modifier, a fluorosilane modifier, or a titanate coupling agent.

The article made from the resin composition may be a resin film prepared by heating and baking to semi-cure the resin composition. The resin composition may be selectively coated on a polyethylene terephthalate film (PET film), a polyimide film (PI film), a liquid crystal resin film, a copper foil or a resin-coated copper (RCC), followed by heating and baking to semi-cure the resin composition to form the resin film.

Resin compositions of various embodiments of the present disclosure may be made into a laminate, such as a copper-clad laminate, which comprises at least two metal foil layers and an insulation layer disposed between the metal foils, wherein the insulation layer is made by curing the resin composition at high temperature and high pressure, a suitable curing temperature being for example between 150° C. and 220° C. and preferably between 190° C. and 210° C., and a curing time being for example between 90 and 180 minutes and preferably between 120 and 150 minutes. The insulation layer may be the aforesaid prepreg or resin film, and the metal foil may be copper, aluminum, nickel, platinum, silver, gold or alloy thereof, such as a copper foil.

The laminate may be further subject to known printed circuit board processes to make a printed circuit board. For example, a double-sided copper-clad laminate (such as product name EM-827, available from Elite Material Co., Ltd.) with a thickness of 28 mil and a 1 ounce (oz) HTE (High Temperature Elongation) copper foil may be provided and subject to hole-drilling and then electroplating, so as to form electrical conduction between the upper layer copper foil and the bottom layer copper foil, so as to make a printed circuit board. Then the upper layer copper foil and the bottom layer copper foil are etched to form inner layer circuits. Then brown oxidation and roughening processes are performed on the inner layer circuits to form uneven structure on the surface to increase roughness. Next, a vacuum lamination apparatus is used to laminate the assembly of a carrier-attached ultra-thin copper foil, the aforesaid prepreg, the inner layer circuits, the aforesaid prepreg and a carrier-attached ultra-thin copper foil by heating at 195° C. for 75 minutes to cure the insulation material of the prepregs. After removing the carrier of the carrier-attached ultra-thin copper foils, black oxidation, drilling, copper plating and other known circuit board processes are performed on the outmost ultra-thin copper foil so as to obtain the printed circuit board.

The resin composition of the present disclosure and various articles made therefrom may have any one or a combination of the following properties:

(1) a glass transition temperature as measured by reference to IPC-TM-650 2.4.24.4 of greater than or equal to 235° C., such as greater than or equal to 240° C., such as between 235° C. and 250° C.;

(2) lower Z-axis ratio of thermal expansion as measured with a TMA instrument by reference to IPC-TM-650 2.4.24.5; for example, the Z-axis ratio of thermal expansion is less than or equal to 2.10%, such as less than or equal to 2.03%;

(3) a peel strength as measured by reference to IPC-TM-650 2.4.8 of greater than or equal to 4.30 lb/inch, for example greater than or equal to 4.50 lb/inch, such as between 4.30 lb/inch and 5.00 lb/inch;

(4) no delamination occurs after 5-hour moisture absorption as measured by reference to IPC-TM-650 2.6.16.1 and IPC-TM-650 2.4.23, indicating high thermal resistance;

(5) a dielectric constant at 10 GHz and 70% resin content as measured by reference to JIS C2565 of less than or equal to 3.60, such as less than or equal to 3.55;

(6) a dissipation factor at 10 GHz and 70% resin content as measured by reference to JIS C2565 of less than or equal to 0.0050, such as less than or equal to 0.0045; and (7) a flame retardancy in compliance with V0 or V1 as specified in the UL94 rating, such as V0.

Raw materials below are used to prepare the resin compositions of various Examples and Comparative Examples of the present disclosure according to the amount listed in Table 1 to Table 3 and further fabricated to prepare test samples or articles. Test results of Examples and Comparative Examples are listed in Table 1 to Table 3 below.
1. Methacrylate-terminated polyphenylene oxide resin: SA-9000, available from SABIC.
2. Vinylbenzyl-terminated biphenyl polyphenylene oxide resin: OPE-2st, available from Mitsubishi Gas Chemical Co., Inc.
3. Styrene-butadiene copolymer: Ricon 100, available from Cray Valley.
4. Bisphenol A cyanate ester resin: BA-230S, available from Lonza.
5. Cyanate ester resin: BTP-6020S, available from Lonza.
6. Polyphenylmethane maleimide: BMI-2300, available from Daiwakasei Industry Co., Ltd.
7. 2,5-dimethyl-2,5-di(tert-butylperoxy)-3-hexyne: 25B, available from NOF Corporation.
8. Phosphazene: SPB-100, available from Otsuka Chemical Co., Ltd.
9. Resorcinol bis[di(2,6-dimethylphenyl)phosphate]: PX-200, available from Daihachi Chemical Industry Co., Ltd.
10. Bisphenol A bis(diphenyl phosphate): CR-741, available from Daihachi Chemical Industry Co., Ltd.
11. Fused silica: available from Sibelco.
12. Zinc octoate: available from Kingyorker Enterprise Co., Ltd.
13. Di-DOPO phosphorus-containing high melting point flame retardant: as shown by Formula (X), synthesized by Applicant by reference to Chinese Patent Application Publication No. CN105936745A.
14. Vinylated-THCPO reactive type phosphorus-containing flame retardant: as shown by Formula (XI), synthesized by Applicant by reference to Chinese Patent Application Publication No. CN106366128A.

Formula (X)

Formula (XI)

TABLE 1

| Resin compositions of Examples (in part by weight) and test results | | | | | | | | | |
|---|---|---|---|---|---|---|---|---|---|
| component | | E1 | E2 | E3 | E4 | E5 | E6 | E7 | E8 |
| polyphenylene oxide resin | SA-9000 | 40 | 40 | 40 | 40 | 40 | 40 | 40 | 40 |
|  | OPE-2st |  |  |  |  |  |  |  |  |
| polyolefin resin | Ricon100 | 10 | 10 | 10 | 10 | 10 | 10 | 10 | 10 |
| cyanate ester resin | BA-230S | 10 | 10 | 10 | 10 | 10 | 10 | 10 | 10 |
|  | BTP-6020S | 10 | 10 | 10 | 10 | 10 | 10 | 10 | 10 |
| maleimide resin | BMI-2300 | 50 | 50 | 50 | 50 | 50 | 50 | 50 | 50 |
| Compound synthesized | Formula (II) | 10 |  | 20 |  | 30 |  |  | 55 |
|  | Formula (III) |  |  |  |  |  | 30 |  |  |
|  | Formula (IV) |  | 10 |  | 20 |  |  | 30 |  |
| inorganic filler | fused silica | 50 | 50 | 50 | 50 | 50 | 50 | 50 | 50 |
| solvent | MEK | 40 | 40 | 40 | 40 | 40 | 40 | 40 | 40 |
|  | toluene | 20 | 20 | 20 | 20 | 20 | 20 | 20 | 20 |
| curing accelerator | zinc octoate | 0.03 | 0.03 | 0.03 | 0.03 | 0.03 | 0.03 | 0.03 | 0.03 |
|  | 25B | 1 | 1 | 1 | 1 | 1 | 1 | 1 | 1 |
| property test | test method | E1 | E2 | E3 | E4 | E5 | E6 | E7 | E8 |
| Tg | DMA (° C.) | 246 | 246 | 246 | 245 | 245 | 245 | 244 | 242 |
| ratio of thermal expansion (50-260° C.) | TMA (Z-axis, %) | 1.90 | 1.92 | 1.90 | 1.93 | 1.95 | 1.97 | 1.98 | 1.98 |
| P/S (lb/inch) | RTF HOz | 4.32 | 4.35 | 4.80 | 4.85 | 4.80 | 4.85 | 4.90 | 4.70 |
| PCT (5 hrs) | 288° C., 20 s | pass | pass | pass | pass | pass | pass | pass | pass |
| Dk | 10 GHz, RC = 70% | 3.52 | 3.52 | 3.50 | 3.50 | 3.47 | 3.47 | 3.45 | 3.43 |
| Df | 10 GHz, RC = 70% | 0.0045 | 0.0044 | 0.0043 | 0.0042 | 0.0041 | 0.0041 | 0.0040 | 0.0040 |
| flame retardancy | UL94 | V-1 | V-1 | V-0 | V-0 | V-0 | V-0 | V-0 | V-0 |

TABLE 2

Resin compositions of Examples (in part by weight) and test results

| component | | E9 | E10 | E11 | E12 | E13 | E14 | E15 |
|---|---|---|---|---|---|---|---|---|
| polyphenylene oxide resin | SA-9000 | 40 | | 20 | 40 | 40 | 40 | 40 |
| | OPE-2st | | 40 | 20 | | | | |
| polyolefin resin | Ricon100 | 10 | 10 | 10 | 10 | 10 | 10 | 10 |
| cyanate ester resin | BA-230S | 10 | 10 | 10 | 20 | | 10 | 10 |
| | BTP-6020S | 10 | 10 | 10 | | 20 | 10 | 10 |
| maleimide resin | BMI-2300 | 50 | 50 | 50 | 50 | 50 | 50 | 50 |
| Compound synthesized | Formula (II) | | 30 | 30 | 30 | 30 | 65 | |
| | Formula (III) | | | | | | | |
| | Formula (IV) | 55 | | | | | | 65 |
| inorganic filler | fused silica | 50 | 50 | 50 | 50 | 50 | 50 | 50 |
| solvent | MEK | 40 | 40 | 40 | 40 | 40 | 40 | 40 |
| | toluene | 20 | 20 | 20 | 20 | 20 | 20 | 20 |
| curing accelerator | zinc octoate | 0.03 | 0.03 | 0.03 | 0.03 | 0.03 | 0.03 | 0.03 |
| | 25B | 1 | 1 | 1 | 1 | 1 | 1 | 1 |
| property test | test method | E9 | E10 | E11 | E12 | E13 | E14 | E15 |
| Tg | DMA (° C.) | 241 | 247 | 246 | 244 | 245 | 240 | 239 |
| ratio of thermal expansion (50-260° C.) | TMA (Z-axis, %) | 2.03 | 1.92 | 1.93 | 1.95 | 1.96 | 2.05 | 2.10 |
| P/S (lb/inch) | RTF HOz | 4.70 | 4.60 | 4.60 | 4.75 | 4.80 | 4.30 | 4.35 |
| PCT (5 hrs) | 288° C., 20 s | pass | pass | pass | pass | pass | pass | pass |
| Dk | 10 GHz, RC = 70% | 3.44 | 3.50 | 3.48 | 3.45 | 3.47 | 3.47 | 3.45 |
| Df | 10 GHz, RC = 70% | 0.0039 | 0.0043 | 0.0042 | 0.0041 | 0.0041 | 0.0041 | 0.0040 |
| flame retardancy | UL94 | V-0 | V-0 | V-0 | V-0 | V-0 | V-0 | V-0 |

TABLE 3

Resin compositions of Comparative Examples (in part by weight) and test results

| component | | C1 | C2 | C3 | C4 | C5 |
|---|---|---|---|---|---|---|
| polyphenylene oxide resin | SA-9000 | 40 | 40 | 40 | 40 | 40 |
| | OPE-2st | | | | | |
| polyolefin resin | Ricon100 | 10 | 10 | 10 | 10 | 10 |
| cyanate ester resin | BA-230S | 10 | 10 | 10 | 10 | 10 |
| | BTP-6020S | 10 | 10 | 10 | 10 | 10 |
| maleimide resin | BMI-2300 | 50 | 50 | 50 | 50 | 50 |
| Compound synthesized | Formula (II) | | | | | |
| | Formula (III) | | | | | |
| | Formula (IV) | | | | | |
| flame retardant | PX-200 | 30 | | | | |
| | SPB-100 | | 30 | | | |
| | CR-741 | | | 30 | | |
| | Di-DOPO | | | | 30 | |
| | vinylated-THCPO | | | | | 30 |
| inorganic filler | fused silica | 50 | 50 | 50 | 50 | 50 |
| solvent | MEK | 40 | 40 | 40 | 40 | 40 |
| | toluene | 20 | 20 | 20 | 20 | 20 |
| curing accelerator | zinc octoate | 0.03 | 0.03 | 0.03 | 0.03 | 0.03 |
| | 25B | 1 | 1 | 1 | 1 | 1 |
| property test | test method | C1 | C2 | C3 | C4 | C5 |
| Tg | DMA (° C.) | 230 | 243 | 228 | 246 | 242 |
| ratio of thermal expansion (50-260° C.) | TMA (Z-axis, %) | 2.98 | 2.90 | 3.00 | 3.50 | 2.10 |
| P/S (lb/inch) | RTF HOz | 4.40 | 4.50 | 4.40 | 4.30 | 4.40 |
| Dk | 10 GHz, RC = 70% | 3.43 | 3.70 | 3.55 | 3.50 | 3.50 |
| Df | 10 GHz, RC = 70% | 0.0041 | 0.0055 | 0.0043 | 0.0044 | 0.0050 |

Preparation of Specimens or Samples for Property Tests:

In the aforesaid property tests, resin compositions of E1 to E15 and C1 to C5 listed in the tables were well mixed in a stirred tank respectively and then placed in an impregnation tank, and fiberglass fabrics (2116 E-glass fiber fabrics, available from Asahi) were individually passed through the impregnation tank to impregnate the fiberglass fabrics with the resin compositions, followed by heating and baking at 120-160° C. to a semi-cured state to obtain prepregs useful for making the following specimens or samples.

1. Copper-Containing Laminate (Obtained by Laminating Five Prepregs)

Two pieces of 0.5 ounce (thickness of 18 μm) RTF copper foil (reverse treated copper foil) and five pieces of prepreg (2116 E-glass fiber fabric) obtained from each sample were prepared, wherein each prepreg has a resin content of about 55%. A copper foil, five prepregs and a copper foil were superimposed in such order and then subject to a vacuum condition for lamination at 195° C. for 2 hours to form each copper-containing laminate sample. In the sample, five superimposed prepregs were cured to form the insulation material layer between the two copper foils, wherein the insulation material layer has a resin content of about 55%.

2. Copper-Free Laminate (Obtained by Laminating Five Prepregs)

Each copper-containing laminate was etched to remove the two copper foils to obtain a copper-free laminate obtained by laminating five prepregs and having a resin content of about 55%.

3. Copper-Free Laminate (Obtained by Laminating Two Prepregs)

Two pieces of 0.5 ounce RTF copper foil and two pieces of prepreg (1080 E-glass fiber fabric) obtained from each sample were prepared, wherein each prepreg has a resin content of about 70%. A copper foil, two prepregs and a copper foil were superimposed in such order and then subject to a vacuum condition for lamination at 195° C. for 2 hours to form each copper-containing laminate sample. Next, each copper-containing laminate was etched to remove the two copper foils to obtain a copper-free laminate obtained by laminating two prepregs and having a resin content of about 70%.

4. Copper-Free Laminate (Obtained by Laminating Eight Prepregs)

Two pieces of 0.5 ounce HTE copper foil and eight pieces of prepreg (7628 E-glass fiber fabric) obtained from each sample were prepared, wherein each prepreg has a resin content of about 45%. A copper foil, eight prepregs and a copper foil were superimposed in such order and then subject to a vacuum condition for lamination at 195° C. for 2 hours to form each copper-containing laminate sample. Next, each copper-containing laminate was etched to remove the two copper foils to obtain a copper-free laminate obtained by laminating eight prepregs and having a resin content of about 45%.

Each specimen was analyzed and tested as described below.

1. Glass Transition Temperature (Tg)

The copper-free laminate (obtained by laminating five prepregs) specimen was subject to glass transition temperature measurement. A dynamic mechanical analyzer (DMA) was used by reference to IPC-TM-650 2.4.24.4 "Glass Transition and Modulus of Materials Used in High Density Interconnection (HDI) and Microvias-DMA Method" to measure each specimen.

2. Ratio of Thermal Expansion (Z-Axis)

The copper-free laminate (obtained by laminating five prepregs) specimen was subject to thermal mechanical analysis (TMA) during the ratio of thermal expansion measurement. Each sample was heated from 50° C. to 260° C. at an increase rate of 10° C./minute and then subject to the measurement of dimensional change (%) by reference to the method described in IPC-TM-650 2.4.24.5, wherein lower dimensional change (%) is more preferred.

3. Peel Strength (P/S)

The copper-containing laminate (obtained by laminating five prepregs) specimen was tested by using a tensile strength tester by reference to IPC-TM-650 2.4.8 to measure the peel strength (lb/inch), i.e., peel strength between a copper foil and an insulation layer.

4. Thermal Resistance after Moisture Absorption (PCT)

The copper-free laminate specimen (obtained by laminating five prepregs) was subject to pressure cooking test (PCT) by reference to IPC-TM-650 2.6.16.1, before which the specimen was subject to moisture absorption for 5 hours (relative humidity 100%) and then soaked in a 288° C. solder bath for 20 seconds, and then removed and inspected for the existence of delamination, which represents fail, such as whether interlayer delamination (i.e., blistering and separation between any layers) occurs between insulation layers.

5. Dielectric Constant (Dk) and Dissipation Factor (Df)

In dielectric constant and dissipation factor measurement, the copper-free laminate (obtained by laminating two prepregs) was tested by using a microwave dielectrometer available from AET Corp. by reference to JIS C2565 "Measuring methods for ferrite cores for microwave device" at 10 GHz for analyzing each specimen. Lower dielectric constant and lower dissipation factor represent better dielectric properties of the specimen. A difference in Dk of greater than 0.05 represents a significant difference in dielectric constant in different laminates. Under a 10 GHz frequency, for a Df value of less than 0.005, a difference in Df of greater than 0.0001 represents substantial difference in dissipation factor in different laminates (i.e., significant technical difficulty).

6. Flame Retardancy

In the flame retardancy test, a 125 mm×13 mm copper-free laminate specimen (obtained by laminating eight prepregs) was measured in accordance with the UL94 rating to evaluate flame retardancy level represented by V-0, V-1, or V-2, wherein V-0 indicates a superior flame retardancy to V-1, V-1 indicates a superior flame retardancy to V-2, and burn-out is the worst.

In addition, solubilization effect of the flame retardant disclosed herein on polar resin and nonpolar resin is also evaluated as below.

For example, 10 parts by weight of polybutadiene (Ricon100) and 50 parts by weight of bismaleimide resin (BMI-2300) were added to a single solvent or a mixed solvent, such as methyl ethyl ketone (60 parts by weight), cyclohexanone (60 parts by weight), Mixed Solvent 1 (containing 40 parts by weight of methyl ethyl ketone and 20 parts by weight of toluene), Mixed Solvent 2 (containing 40 parts by weight of dimethyl acetamide and 20 parts by weight of toluene) or Mixed Solvent 3 (containing 40 parts by weight of methyl ethyl ketone and 20 parts by weight of dimethyl acetamide); alternatively, two solvents contained in Mixed Solvent 1, Mixed Solvent 2 or Mixed Solvent 3 were used to dissolve polybutadiene and bismaleimide resin separately and then mixed together; in both cases, polybutadiene will precipitate and layer separation of resins occurs ("○" denotes layer separation and "X" denotes no layer separation), as the result of Sample A. Then 10 parts by weight of the flame retardant of this disclosure (Formula (II), Formula (III) or Formula (IV)) or other flame retardants were added and well mixed. After standing still for 24 hours, the resin mixtures were observed to see whether layer separation occurs. The added flame retardant promotes solubilization if no layer separation occurs. The results are shown in Table 4.

TABLE 4

Results of solubilization test

| Sample | A | B | C | D | E | F | G | H | I |
|---|---|---|---|---|---|---|---|---|---|
| Resin composition | 10 parts by weight of polybutadiene (Ricon 100) and 50 parts by weight of bismaleimide resin (BMI-2300) | | | | | | | | |
| Flame retardant | none | Formula (II) | Formula (III) | Formula (IV) | PX-200 | SPB-100 | CR-741 | Di-DOPO | vinylated-THCPO |
| Solvent 1 | 40 parts by weight of methyl ethyl ketone and 20 parts by weight of toluene | | | | | | | | |
| layer separation | ○ | X | X | X | ○ | ○ | ○ | ○ | ○ |
| Solvent 2 | 40 parts by weight of dimethyl acetamide and 20 parts by weight of toluene | | | | | | | | |
| layer separation | ○ | X | X | X | ○ | ○ | ○ | ○ | ○ |
| Solvent 3 | 40 parts by weight of methyl ethyl ketone and 20 parts by weight of dimethyl acetamide | | | | | | | | |
| layer separation | ○ | X | X | X | ○ | ○ | ○ | ○ | ○ |

The results in Table 1 to Table 4 indicate that the specimens using the compound of Formula (I) of the present disclosure as the flame retardant have one or more of the following properties improved: glass transition temperature, ratio of thermal expansion, peel strength, thermal resistance, dielectric constant, dissipation factor and flame retardancy. For example, properties including Z-axis ratio of thermal expansion of less than or equal to 2.10% and dissipation factor of less than or equal to 0.0045 can both be achieved. More surprisingly, it is found that the compound of Formula (I) of the present disclosure may increase the compatibility of polar resin and nonpolar resin and significantly promote the solubilization effect.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A compound having a structure represented by the following Formula (I):

Formula (I)

wherein X represents a covalent bond, $-C(CH_3)_2-$, $-CH(CH_3)-$, $-CH_2-$, $-SO_2-$, $-S-$, or $-O-$;
$Q^1$ and $Q^2$ individually represent a functional group containing a C=C unsaturated bond; and
$J^1$ and $J^2$ individually represent a flame retardant group containing a phosphorus atom, wherein $J^1$ and $J^2$ individually have the following structure:

wherein A is oxygen or sulfur; n1 is 0 or 1; dotted line represents absence of a bond; and $R_1$ and $R_2$ individually represent an alkyl group with or without a double bond, an aryl group with or without a double bond, an alkoxy group, an aryloxy group, a sulfur-containing alkyl group, a sulfur-containing aryl group, a silyl group, or a siloxanyl group, and $R_1$ and $R_2$ are individually substituted or unsubstituted.

2. The compound of claim 1, wherein X represents a covalent bond, $-C(CH_3)_2-$, $-CH(CH_3)-$ or $-CH_2-$.

3. The compound of claim 1, wherein $Q^1$ and $Q^2$ individually represent a C2 to C6 aliphatic hydrocarbyl group having a C=C unsaturated bond.

4. The compound of claim 1, wherein $J^1$ and $J^2$ individually contain a P=O double bond or a P—O single bond.

5. The compound of claim 1, wherein $J^1$ and $J^2$ individually represent a diphenyl phosphate group with substituted or unsubstituted benzene rings or a diphenylphosphine oxide group with substituted or unsubstituted benzene rings.

6. The compound of claim 1, having any one of the following structures:

Formula (II)

-continued

Formula (III)

Formula (IV)

7. The compound of claim 1, having a phosphorus content of between 6.0% and 9.0%.

8. A method of making the compound of claim 1, comprising: reacting a compound with a flame retardant group containing a phosphorus atom with a bisphenol compound with a C=C unsaturated bond.

9. A method of using the compound of claim 1 as crosslinking agent and flame retardant of a resin composition.

10. A resin composition comprising the compound of claim 1 and a resin.

11. The resin composition of claim 10, wherein the resin is an unsaturated bond-containing resin.

12. The resin composition of claim 11, wherein the unsaturated bond-containing resin comprises one or more carbon-carbon double bonds, carbon-nitrogen double bonds or carbon-nitrogen triple bonds.

13. The resin composition of claim 11, wherein the unsaturated bond-containing resin comprises polyolefin, cyanate ester resin, maleimide resin, vinyl-containing polyphenylene oxide resin, styrene, divinylbenzene, triallyl isocyanurate, triallyl cyanurate, a prepolymer thereof, or a combination thereof.

14. The resin composition of claim 10, wherein the resin comprises a polar resin and a nonpolar resin, and the compound increases compatibility of the polar resin and the nonpolar resin.

15. The resin composition of claim 10, comprising 1 to 100 parts by weight of the compound relative to 100 parts by weight of the resin.

16. An article made from the resin composition of claim 10, comprising a prepreg, a resin film, a laminate or a printed circuit board.

17. The article of claim 16, having at least one of the following properties:
 a Z-axis ratio of thermal expansion measured with a TMA instrument by reference to IPC-TM-650 2.4.24.5 of less than or equal to 2.10%; and
 a dissipation factor at 10 GHz as measured by reference to JIS C2565 of less than or equal to 0.0045.

* * * * *